UNITED STATES PATENT OFFICE.

FREDERICK M. BECKET, OF NIAGARA FALLS, NEW YORK, ASSIGNOR TO ELECTRO METALLURGICAL COMPANY, A CORPORATION OF WEST VIRGINIA.

PROCESS OF REDUCING VANADIUM FROM SULFID ORES.

No. 893,128.   Specification of Letters Patent.   Patented July 14, 1908.

Application filed June 26, 1907. Serial No. 380,905.

*To all whom it may concern:*

Be it known that I, FREDERICK M. BECKET, a subject of the King of Great Britain, residing at Niagara Falls, in the county of Niagara and State of New York, have invented certain new and useful Improvements in Processes of Reducing Vanadium from Sulfid Ores, of which the following is a specification.

In the production of vanadium or vanadium alloys from sulfid ores, it is customary to first roast the sulfids to oxids and to then subject the roasted product or a concentrate therefrom to the action of a reducing agent.

According to the present process, vanadium sulfid ores are directly reduced in an electric furnace by a desulfurizing agent, preferably one containing a plurality of elements capable of uniting with sulfur, and specifically a calcium compound and carbon, for example either a mixture of calcium oxid and carbon or calcium carbid. As typical of the process, the chief reaction which takes place when the mixture consists of vanadium sulfid, lime and carbon may be expressed by the following general equation:—

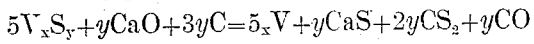

When calcium carbid is the reducing agent the reaction is as follows:—

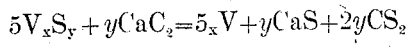

It is not necessary to adhere strictly to the molecular proportions indicated by the above equations, because the reaction

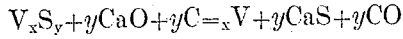

takes place to a limited extent, and various intermediate and subsidiary reactions may take place.

The materials constituting the charge are mixed and are then brought to such a temperature in an electric furnace as to not only cause the reaction to take place but to thoroughly fuse the product and allow of its complete separation from the slag, which consists largely of an alkali or alkaline-earth metal sulfid. An electric furnace having superposed tapholes for the separate removal of metal and slag is preferably employed. The carbon bisulfid liberated from the furnace may be collected as such or utilized as sulfur dioxid after oxidation by air.

In the production of alloys of vanadium with iron, nickel or other metal, the alloying metal may be directly added to the charge or may be reduced from its compound added to the charge, simultaneously with the reduction of the vanadium.

By this process vanadium or vanadium alloys containing a very low percentage of carbon and merely a trace of sulfur may be produced from sulfid ores in a single operation by the use of very cheap raw materials as reducing agents.

The mixture containing an alkali or alkaline-earth metal and carbon specified in certain claims is to be understood as one in which the metal may be present either as an oxid, carbonate or other salt, or as a carbid, the carbon being either free or combined as carbid.

I claim:

1. The process of reducing vanadium, which consists in smelting a mixture of vanadium sulfid and a desulfurizing and reducing agent, as set forth.

2. The process of reducing vanadium, which consists in smelting a mixture containing vanadium sulfid and a plurality of reducing elements capable of uniting with sulfur, as set forth.

3. The process of reducing vanadium, which consists in smelting a mixture containing vanadium sulfid, an alkali or alkaline-earth metal and carbon, as set forth.

4. The process of reducing vanadium, which consists in smelting a mixture containing vanadium sulfid, an alkali or alkaline-earth-metal compound and carbon, as set forth.

5. The process of reducing vanadium, which consists in smelting a mixture of vanadium sulfid, an oxygen compound of a metal having a relatively high affinity for sulfur, and carbon, as set forth.

6. The process of reducing vanadium, which consists in smelting a mixture of vanadium sulfid, a calcium compound and carbon, as set forth.

7. The process of reducing vanadium, which consists in smelting a mixture of vanadium sulfid, calcium oxid and carbon, as set forth.

8. The process of producing vanadium alloys, which consists in smelting a mixture of vanadium sulfid, a desulfurizing and reducing agent and a source of the alloying metal, as set forth.

9. The process of producing vanadium alloys, which consists in smelting a mixture containing vanadium sulfid, a plurality of reducing elements capable of uniting with sulfur, and a source of the alloying metal, as set forth.

10. The process of producing vanadium alloys, which consists in smelting a mixture containing vanadium sulfid, an alkali or alkaline-earth-metal, carbon and a source of the alloying metal, as set forth.

11. The process of producing vanadium alloys, which consists in smelting a mixture of vanadium sulfid, an oxygen compound of a metal having a relatively high affinity for sulfur, carbon and a source of the alloying metal, as set forth.

12. The process of producing vanadium alloys, which consists in smelting a mixture of vanadium sulfid, calcium oxid, carbon and a source of the alloying metal, as set forth.

In testimony whereof, I affix my signature in presence of two witnesses.

FREDERICK M. BECKET.

Witnesses:
C. E. MOSHER,
J. N. DEINHARDT.